(12) United States Patent
Olhofer et al.

(10) Patent No.: US 7,982,732 B2
(45) Date of Patent: *Jul. 19, 2011

(54) EVOLUTIONARY DESIGN OPTIMIZATION USING EXTENDED DIRECT MANIPULATION OF FREE FORM DEFORMATIONS

(75) Inventors: Markus Olhofer, Seligenstadt (DE); Stefan Menzel, Dreieich (DE); Bernhard Sendhoff, Bruchköbel (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 940 days.

This patent is subject to a terminal disclaimer.

(21) Appl. No.: 11/683,921

(22) Filed: Mar. 8, 2007

(65) Prior Publication Data
US 2007/0226661 A1    Sep. 27, 2007

(30) Foreign Application Priority Data
Mar. 27, 2006   (EP) .................................... 06006294

(51) Int. Cl.
*G06T 15/00* (2006.01)
(52) U.S. Cl. ............ 345/419; 345/420; 345/646; 703/1; 703/2; 716/2; 716/10
(58) Field of Classification Search .................. 345/419, 345/420, 646; 703/1, 2; 716/2, 10
See application file for complete search history.

(56) References Cited

U.S. PATENT DOCUMENTS

| | | | | |
|---|---|---|---|---|
| 5,566,281 A | * | 10/1996 | Tokumasu et al. | 345/420 |
| 5,818,452 A | * | 10/1998 | Atkinson et al. | 345/420 |
| 6,608,631 B1 | * | 8/2003 | Milliron | 345/647 |
| 7,596,283 B2 | * | 9/2009 | Xu et al. | 382/294 |

OTHER PUBLICATIONS

European Search Report, EP 06006294.0, Jan. 16, 2007, 7 pages.
European Search Report, EP 06006293.2, Jan. 16, 2007, 8 pages.
Hsu, W. M. et al., "Direct Manipulation of Free-From Deformations," Computer Graphics, Jul. 1992, pp. 177-184, vol. 26, No. 2, New York, New York, U.S.A.
Menzel, S. et al., "Application of Free Deformation Techniques in Evolutionary Design Optimisation," 6th Work Congress on Structural and Multidisciplinary Optimization, [online], May 2005, pp. 1-10, [retrieved on Mar. 31, 2006]. Retrieved from the Internet<URL:http://www.wcsmo6.org/papers/5161.pdf>.
Sederberg, T. W. et al., "T-spline and T-NURCCs," ACM Transactions On Graphics, Jul. 2003, pp. 477-484, vol. 22, No. 3, ACM, New York, New York, U.S.A.
Zhao, G. et al., "Detail-Preserving Variational Design of B-Spline Curves and Surfaces," IEEE, Proceedings of the 2003 International Conference on Cyberworlds, Dec. 3, 2003, 8 pages, Piscataway, New Jersey, U.S.A.
Jin, Y. "Evolutionary Optimization in Uncertain Environments—A Survey," IEEE Transactions on Evolutionary Computation, Jun. 2005, vol. 9, No. 3, 15 pages.
Sarakinos et al., Exploring Freeform Deformation Capabilities in Aerodynamic Shape Parameterization, Computer as a Tool, EUROCON 2005, Nov. 24-25, 2005, pp. 535-538, Serbia and Montenegro, Belgrade.

* cited by examiner

*Primary Examiner* — Kimbinh T Nguyen
(74) *Attorney, Agent, or Firm* — Fenwick & West LLP

(57) ABSTRACT

An improved optimization of a design, based on direct manipulations of the object points of a design where the number and modifications of control points is kept as minimal as possible while the targeted movement of object points is realized.

8 Claims, 8 Drawing Sheets

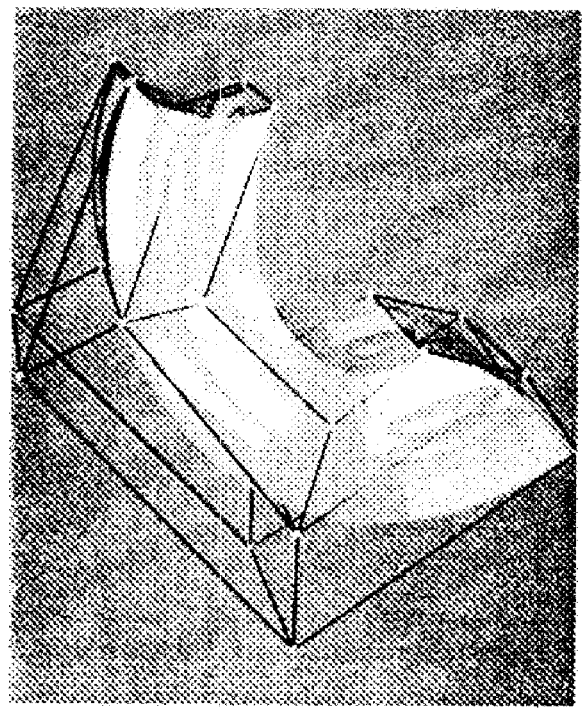
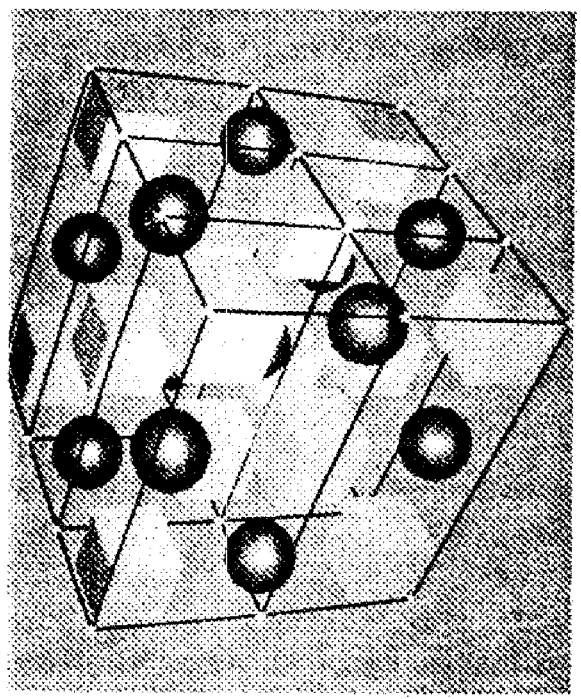
Fig. 2

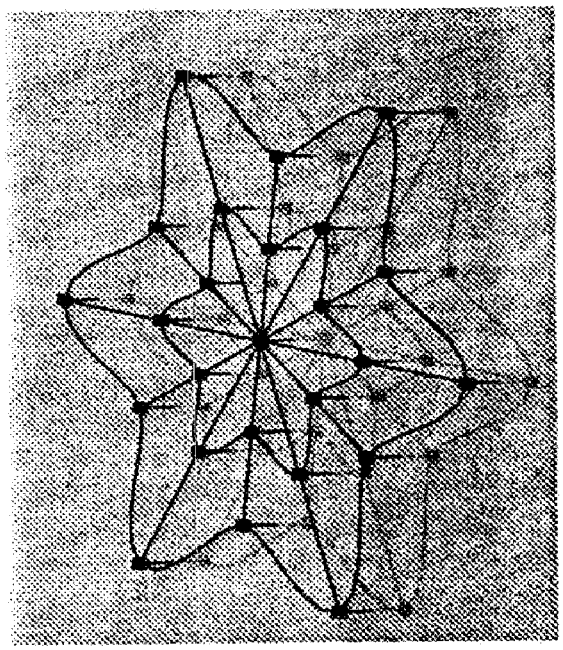
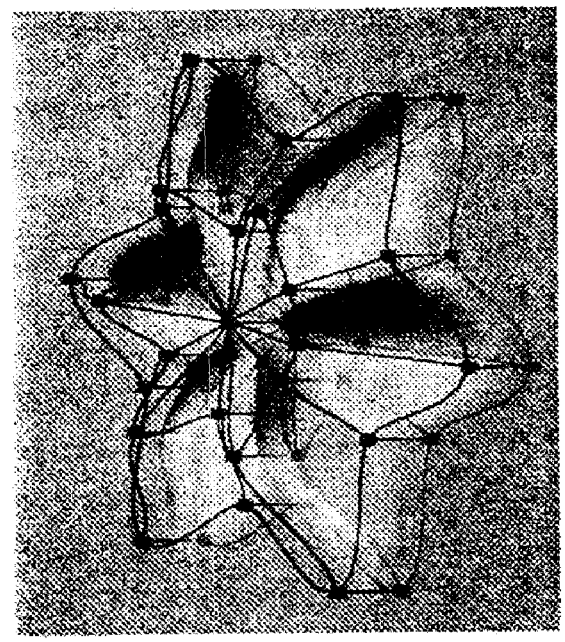
Fig. 3

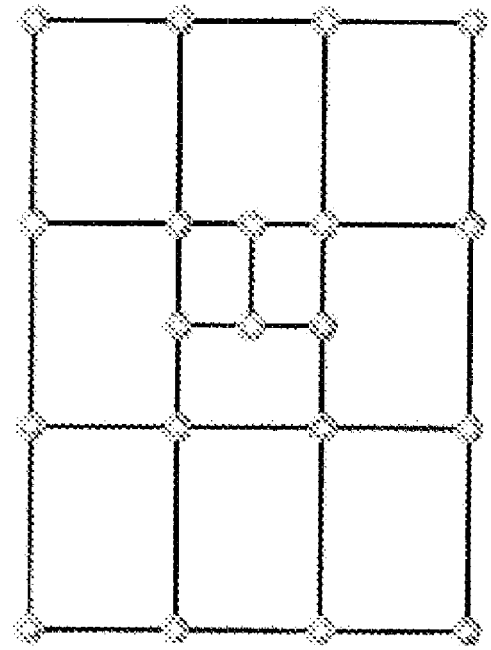
Fig. 4
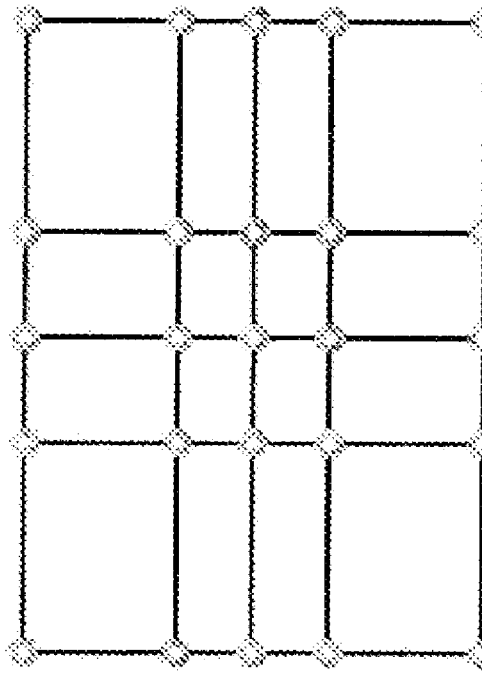

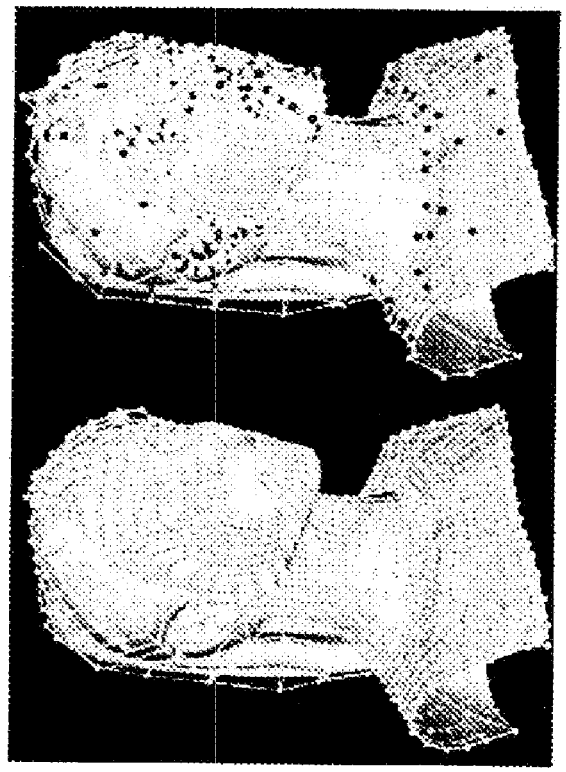
Fig. 5
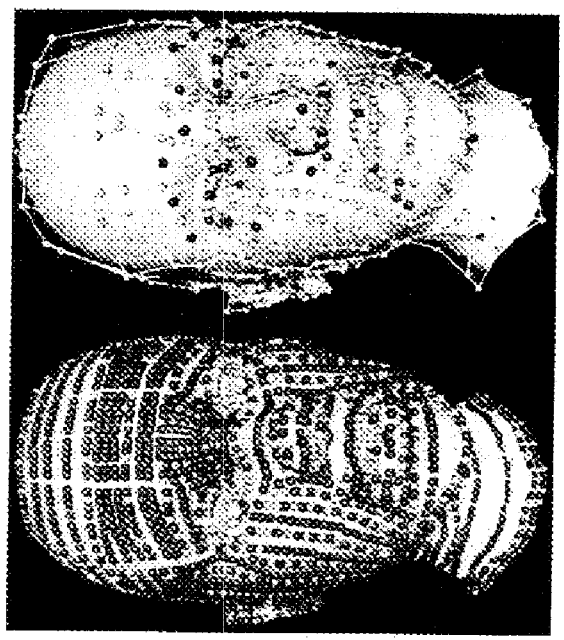

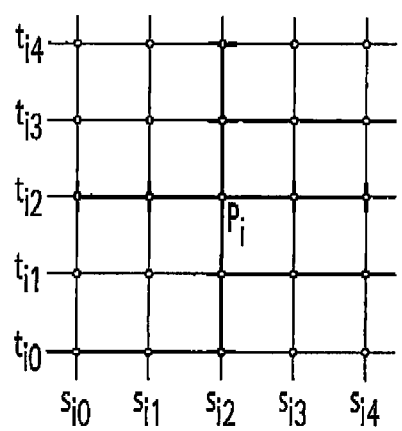
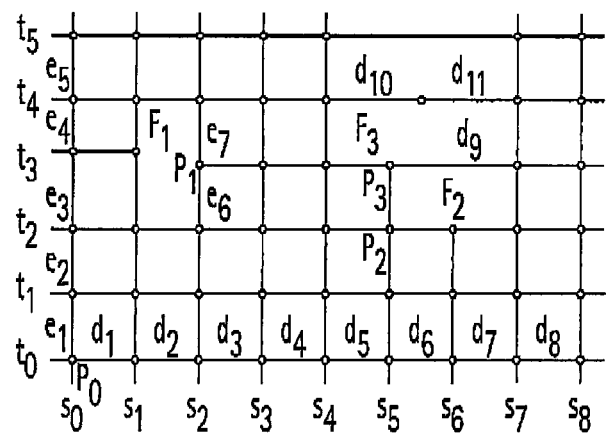
Fig. 6

EVOLUTIONARY DESIGN OPTIMIZATION USING EXTENDED DIRECT MANIPULATION OF FREE FORM DEFORMATIONS

RELATED APPLICATIONS

This application claims benefit under 35 USC 120 to European patent application 06006294.0 filed on Mar. 27, 2006 which is incorporated by reference herein in its entirety. This application is also related to U.S. patent application Ser. No. 11/983,910, filed on Mar. 8, 2007 entitled "Evolutionary Direct Manipulation of Free Form Deformation Representations for Design Optimization" whose inventors are Dr. Markus Olhofer, Dr. Stefan Menzel and Dr. Bernhard Sendoff, which is incorporated by reference herein in its entirety.

BACKGROUND OF THE INVENTION

In order to apply optimization algorithms to design optimization problems it is essential to find ways to describe the shape of a design by a set of parameter which can be modified by the optimization algorithm. A well known method is for example to define a spline line, for two dimensional surfaces or a spline surface for three dimensional designs, which describe the surface of the object which is to be optimized. In this case the parameter which are modified by the optimization algorithms are the control and knot points, in the case of NURBS (non rational B-splines) additionally the weights of the control points. Another way of representing a given design is to define a transformation function which transforms the space in which a basic design is given. In this case a variation of a shape can be realized by modifying parameter of a transformation function. These methods can be summarized under the term of free form deformation.

Constrained Deformation

The principle of constrained deformation is formulated by Borrel and Bechman in P. Borrel and D. Bechmann, *Deformation of n-dimensional Objects, International Journal of Computational Geometry Applications*, 1(4):427-453, 1991 which is incorporated by reference herein in its entirety. They developed a general deformation scheme in which the deformation is defined by an arbitrary number of user-specified point displacement constraints. The deformation method from Borrel and Bechmann, which is illustrated in FIG. 1, is based on the following principle: the original and deformed space $R^n$ are two projections of a higher dimensional space $R^m$. The deformation is thus defined by the composition of a function $f$: In $R^n \rightarrow R^m$ that transforms the points of the original space $R^n$ into points of $R^m$ with a projection T from $R^m$ back onto $R^n$. The projection matrix is computed so as to achieve given displacements (called constraints) of given points (called constraints points) of the original space.

Mathematically stated, the deformation function d, which expresses the transformation on any point of $R^n$, is expressed as the composition of a function $f$: $R^n \rightarrow R^m$ (m>n) with a linear transformation T: $R^m \rightarrow R^n$. If $U \in R^n$ and M the corresponding matrix of T, results in:

$$d(U)=Mf(U).$$

Different functions $f$ produce different types of deformation, global or local for example. The concrete deformation depends only on the matrix M. The corresponding transformation T selects an appropriate deformation from the set of potential ones. The greater m in contrast to n the larger the range of possible deformations.

Generally, this model encapsulates a large family of possible deformations: for example, linear space transformations are obtained if $f$ is linear, or FFD are obtained if $f$ is a tensor product Bernstein polynomial and if M is built with displacement vectors of control points.

Once $f$ and m are specified the choice of an appropriate M and consequently the transformation of arbitrary points $U \in R^n$ is carried out in three steps with the help of the $n_c$ constraint points $V_i$:

1. Select the desired displacement of the no constraint points $V_i$, $i \in [1, n_c]$.

These points essentially establish the degrees of freedom for a design optimization.

2. The projection matrix M is obtained by solving n systems of $n_c$ equations, each with m unknowns constituting one row of M. This system in turn is derived from the $n \times n_c$ equations:

$$d(V_i)=Mf(V_i) \; \forall i \in [1, n_c]$$

Unfortunately, this system of equations is not uniquely solvable in any case, which constitutes the main drawback of the technique described here. Three situations may be distinguished: (a) If m is greater than $n_c$ and all $f(V_i)$ vectors are linearly independent there exists an infinity of solutions. Choosing one M by the user fixes the deformation. Several ways to do so were discussed by Borrel and Bechmann, (b) If $m=n_c$ only one solution M exists, (c) Otherwise no deformation can be found satisfying the constraints. In this case a best approximate solution is used.

3. The displacement of any point U is computed by $d(U)=Mf(U)$.

Due to the fact that the re-transformations M only depends on the constraint points $V_i$, the deformation of an initial object U (set of points $U_i$ can be carried out very efficiently. The values $f(U_i)$ need to be computed only once and can then be used for several deformations defined by several sets of constraints. Consequently, design optimization requires the re-computation of the values of $f(V_i)$ only for the constraints added, deleted or changed, and not for the object points $U_i$.

As already pointed out, the selection process of M is technically demanding and requires user interaction. Additionally, the shape of the deformation is not strongly correlated with the constraints which makes the technique non-intuitive.

In order to circumvent these deficits, Borrel and Rappoport simplified the general constraint deformation concept, now termed Simplified Constraint Deformation short "Scodef" in P. Borrel and A. Rappoport, *Simple Constrained Deformations for Geometric Modeling and Interactive Design, ACM Transactions on Graphics*, 13(2):137-155, April 1994 which is incorporated by reference herein in its entirety. The central idea of the Scodef approach is the unification of the re-transformation M and therefore the simplification of the whole process. This is achieved by the choice off $f$ as a tensor product of B-spline basis functions each centered at a constraint point where each point influences the deformation process. Additionally, for each of the $n_c$ constraint points a radius is introduced which affects the scope of each B-spline, i.e., each basis function falls to zero beyond the radius of the corresponding constraint point. Thus the different radii may be used for a fine-tuning of the deformation process. Consequently, a 'Scodef deformation can be viewed as the deformation obtained by creating an arbitrary number of possible overlapping B-spline-shaped "bumps" over the space. The location and height of a bump are defined by a constraint and its width by the constraints radius of influence'.

The use of B-splines gives a strong evidence that this technique can represent complex curves efficiently and accurately, as B-splines do.

For a design optimization using ESs the constraints and/or the displacements of the constraints constitute the free parameters which may be modified with the help of ES-standard genetic operators. In the case of the simple constraint deformation, the radii associated with the $n_c$ constraint points $V_i$ may be used as additional design parameters. As a result from that, three groups of design parameters are available which make the technique very flexible in the number of design parameters. In the best case only four constraint points are necessary for the deformation of a 3D object. Additionally, due to the underlying system of $n_c$ equations, triples of constraint points, their displacements and radii can easily be added or deleted without influencing other design parameters. Of course, such an adaptation process can change the structure of the transformation matrix M and therefore the resulting design. This is in contrast to e.g., B-splines or NURBS where curve of surface preserving addition operators exist which in contrast force the recalculation of control points.

Free Form Deformation (FFD)

Although developed earlier, the Free Form Deformation (FFD) approach (see FIG. 2) is a special case of the constraint deformation approach described above. The FFD approach is described in T. W. Sederberg and S. R. Parry, *Free-Form Deformation of Solid Geometric Models, Computer Graphics*, 20(4):151-160, August 1986, which is incorporated by reference herein in its entirety.

This is true if the transformation function $f$ is a tensor product of Bernstein polynomials (or B-spline basis functions in the case of the simplified constraint deformation) and if M is built with displacement vectors of control points. Very similar to constraint deformation, FFD focuses on the formulation of a more general interactive shape editing concept. Sederberg and Parry cited above considered the precise specification of modifications of curves or surfaces built with Bézier, B-splines and NURBS as too laborious in most situations. Even a perceptually simple change may require adjustment of many control points, see S. Gibson and B. Mirtich, *A Survey of Deformable Modeling in Computer Graphics*, Tech. Report No. TR-97-19, Mitsubishi Electric Research Lab., Cambridge, November 1997, which is incorporated by reference herein in its entirety.

Sederberg and Parry generalized the approach in Barr (A. H. Barr, *Global and Local Deformation of Solid Primitives, Computer Graphics*, 18(3):21-30, 1984 which is incorporated by reference herein in its entirety) on regular deformations (i.e., mappings $R^3$ to $R^2$) of solids by embedding an object in a lattice of grid points of some standard geometry such as a cube or cylinder. Manipulating nodes of the grid induces deformations on the space inside the grid with the help of trivariate tensor product Bernstein polynomial. These deformations transform the underlying graphics primitives that form the object. Sederberg and Parry gave a good physical analogy for FFD. Consider a parallelepiped of clear, flexible plastic in which is embedded an object, or several objects, which is to be deformed. The object is imagined to also be flexible, so that it deforms analog with the plastic that surrounds it.

As already pointed out, the first step of the FFD is the fixation of the local coordinate system S, T, U of the enclosing parallelepiped region. With the help of some basic linear algebra, each point X in the parallelepiped may be expressed in the new coordinate system such that $$X = X_0 + sS + tT + uU.$$

Since the idea of FFD is that the deformation of the enclosing volume induces deformations on the space inside the volume, the next step is the formulation of a grid of control points $P_{ijk}$ on the parallelepiped. The l grid points in S direction, m points in T direction, and n points in U direction allow for the formulation of the deformed enclosing volume with the help of trivariate tensor product Bernstein polynomials whose control points are the grid points. The deformation of the control points which essentially build the free parameters for a potential design optimization is simply specified by moving the $P_{ijk}$ from their undisplaced lattice positions. The deformed position $X_{ffd}$ of an arbitrary point X is found by first computing its (s, t, u) coordinates in the local coordinate system and then evaluating the vector valued trivariate Bernstein polynomial:

$$X_{ffd} = \sum_{i=0}^{l} \binom{l}{i}(1-s)^{l-i}s^i \left\{ \left[ \sum_{j=0}^{m} \binom{m}{j}(1-t)^{m-j}t^j \left\{ \sum_{k=0}^{n} \binom{k}{n}(1-u)^{k-n}u^k P_{ijk} \right\} \right] \right\}$$

where $X_{ffd}$ is a vector containing the Cartesian coordinates of the displaced point, and where each $P_{ijk}$ is a vector containing the Cartesian coordinates of the control points. In contrast to most other design representation techniques, the primary motivation of the (simple) constraint deformation approach is not an intuitive design tool for shape designers. Instead, a shape modification tool which is independent of the underlying geometric representation is of primary interest.

Extended Free Form Deformation (EEFD)

To improve the basic free form deformation concepts which have been introduced by Sederberg et al. with respect to a higher degree of flexibility Coquillart developed a method called Extended Free Form Deformation in S. Coquillart, *Free-Form Deformation: A Sculpturing Tool for 3D Geometric Modeling, Computer Graphics*, 24(4):187-196, August 1990, which is incorporated by reference herein in its entirety. This method allows the use of arbitrary control volumes in contrast to the restrictive requirement of parallelepiped volumes of control points in standard free form deformation. Because of this change the procedure of deforming an object had to be adapted and the mathematical foundation switched to B-splines. It mainly falls into three steps which are described briefly as follows, see FIG. 3.

At first a lattice of control points has to be constructed which encloses either the whole object or a part of the object which is targeted for being modified. In a second step the geometry coordinates have to be transferred into the parameter space of the lattice which is also called "freezing." By freezing an object the u, v and w coordinates of the geometry in spline parameter space are calculated. This is usually done by Newton approximation which promises to be the fastest approach but it can also be done by similar gradient based methods or even by evolutionary optimization. After the u, v and w coordinates have been calculated successfully the deformations can be applied by moving the control points to the desired positions and updating the x, y and z coordinates of the surface or solid. Therefore the B-spline equations have to be solved using the new spatial coordinates of the control points. This method is also valid if the geometry model equals a solid or is defined by parametric or implicit equations.

EFFDs are quite effective for creating impressions, reliefs and other fairly simple deformations that might otherwise be difficult to achieve with FFDs. However, the user must know the general shape of the deformation before starting to model, and the interface is still a direct representation of the underlying mathematics.

More generally, although the movement of control points gives an indication of the resulting deformation, some shapes are not intuitive in form. Complex deformation operations often require a large number of control points resulting in screen clutter. They also tend to get buried within the model to be deformed. As a result, it is virtually impossible to select or manipulate the control points efficiently.

Direct Manipulation of Freeform Deformations (DFFD)

In view of these problems, a direct approach to freeform deformations has been introduced by Hsu et. al. (Direct Manipulation of Free-Form Deformations, Computer Graphics, 26, 2. July 1992). The essential idea is that the user selects (with some sort of pointer) a point on an object and then moves the pointer to a location where that object point should be. Then, the necessary alteration to the control points of the FDD spline that will induce this change is automatically computed. In general, this alteration will be under-determined; therefore, Hsu et. al. (cf. above) use a least squares approach to select a particular alteration.

This approach is problematic insofar, as the desired direct manipulation of the free form may not be realisable with the current grid representation, but only with a grid representation that is optimized with respect to its own structure. Such a structure optimization cannot be realized using least square methods.

The problem of an ill structured control volume, using direct manipulation of object points and an application of least squares methods is especially crucial if one wants to prevent loops in the design and invalid surfaces. If the alteration of control points is calculated in a least square sense, the problem often occurs that the order of control points changes which leads to invalid surfaces.

SUMMARY OF THE INVENTION

An improved optimization of a design, based on direct manipulations of the object points of a design where the number and modifications of control points is kept as minimal as possible while the targeted movement of object points is realized.

BRIEF DESCRIPTION OF THE FIGURES

Further aspects and advantages of the invention will become apparent when reading the following detailed description in connection with the annexed drawing, in which

FIG. 2 shows the principle of Free Form Deformation.

FIG. 3 shows the principle of EFFD: undisplaced (left) and modified (right) control points of an arbitrary control volume in accordance with one embodiment of the present invention.

FIG. 4 shows the Example of a B-spline-mesh and a T-mesh in accordance with one embodiment of the present invention.

FIG. 5 shows examples for T-spline simplification in accordance with one embodiment of the present invention.

FIG. 6 shows (left) knot lines for blending function and (right) T-mesh in accordance with one embodiment of the present invention.

DETAILED DESCRIPTION OF THE INVENTION

Figure 1:
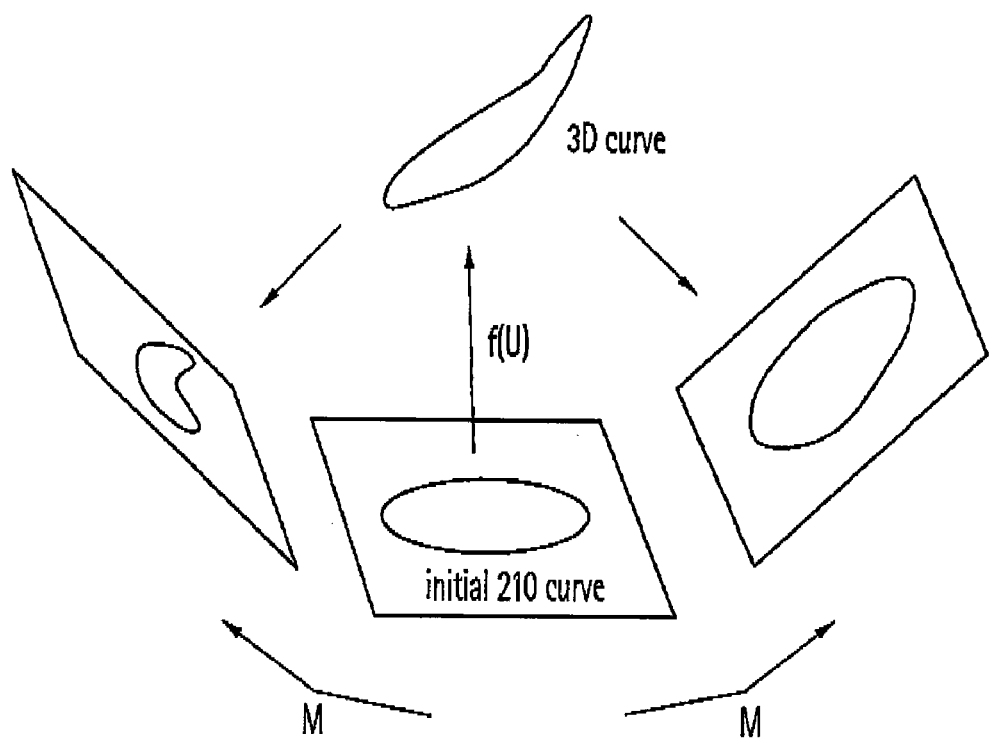
FIG. 1 shows the principle of constraint deformation: A 3D curve is computed from the original 2D curve, and projected twice to obtain two different deformed 2D curves.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Extended Free Form Deformation in Evolutionary Computation

In terms of evolutionary optimization the application of free form deformation techniques features a lot of advantages, especially if the geometric definition of the shape which has to be optimized is rather complicated and/or if costly Computational Fluid Dynamics (CFD) or Finite Element Methods (FEM) calculations respectively have to be performed. Integrating free form deformations the parameters which are targeted for being optimized are not defined by the shape geometry itself but by the control points of the lattice(s). As a consequence the designer is free to choose the degree of global or local shape changes.

In general, before the optimization loop can start the initial shape has to be embedded in the lattice(s) and the geometry has to be frozen to obtain the u, v and w-coordinates in parameter space. These coordinates play the major role in the genotype-phenotype mapping before the design evaluation step in the evolutionary optimization. Based on the control points as parameters the mutation can be applied and the systems can be prepared for fitness evaluation. Therefore the new designs are calculated via B-spline or Nurbs equations based on the frozen u, v, w-coordinates coupled with the new control points. Afterwards the designs can be evaluated and the fitness values are assigned to each individual. Finally the new parameters are selected and the parents for the following generation are determined according to the chosen evolutionary algorithms.

The Effect of (Extended) Free Form Deformation Coupled With CFD or EM Evaluation To understand the enormous advantage of free form deformation in combination with CFD or FEM one has to consider that a modification of the position of a control point has a strong influence on a certain spatial region of the lattice. This whole volume which size is defined by e.g. the type of spline, spline degree, number of control points, knot vectors etc. is deformed, i.e. not only the shape design which is found inside this volume but also all its surrounding. As a consequence concerning CFD calculations every grid point positioned in this volume is deformed too. So for complicated shapes the computational costly mesh generation process can be omitted because the grid is directly adapted to the deformed shape when the free form deformation is applied. Secondly, in terms of CFD it is also possible to use prior results which had been already converged to a solution instead of repeating a whole, time consuming CFD calculation.

Parameter Adaptiveness of (Extended) Free Form Deformation

This extension of the Free Form Deformation is a particularly advantageous further development of the present invention. In any kind of optimization a high degree of flexibility of the applied representation is advantageous. The designer is always forced to find an adequate trade-off between search space and parameter minimization. On the one hand as many as possible designs have to be represented and on the other hand a low number of parameters has to be used to speed up the optimization process. A good alternative to flexibility is offered by representations which are adaptive. As a consequence in the beginning of the optimization only a few parameters have to be optimized and in the course of convergence the number of parameters can be increased.

Free form deformations offer the possibility to extend the knot vectors by adding further control points without changing the actual shape in the design process. This fact is very important in an evolutionary design optimization. One can start the optimization with only quite a low number of parameters and, whenever needed, new control points can be added to extend the influence on the shape without losing the actual best design. Beside these very positive features of this representation the control point insertion is accompanied by one major disadvantage. Whenever new control points have to be inserted there only exists the possibility to introduce a whole new row or column of control points if two-dimensional or a plain of control points if three-dimensional into the control point grid. So unfortunately it is not possible to insert only one control point where it is directly needed for geometrical reasons but as a consequence many superfluous points have to be taken into account. To minimize this effect the concepts of T-splines are highlighted in chapter 0 which are a special kind of point-based B-splines allowing the insertion of only partial rows or columns of control points into the control mesh.

The concepts of T-splines have been introduced by Sederberg et al. in T. W. Sederberg, J. Zheng, A. Bakenov and A. Nasri, *T-splines and T-NURCCs, ACM Transactions on Graphics*, 22(3):477-484, July 2003, which is incorporated by reference herein in its entirety, to achieve more flexibility in the process of graphical designing. T-splines are a generalization of non-uniform B-splines surfaces offering an immense benefit in terms of specifying the arrangement of control points in the underlying mesh. In contrast to a B-spline surface which require a rectangular grid of control points defined in each cross of a horizontal and vertical line the lines in a T-mesh need not to start and end on the edges of the grid but they can terminate in a T-junction (compare. FIG. 4). As a consequence the total number of control points is reduced drastically. This fact becomes even more important if one or more additional control points has/have to be inserted to allow a more flexible and efficient surface design. In a B-spline surface a complete new column and/or row of control points have/has to be provided whereas in a T-mesh in most cases only a low number of new points has to be added.

For the procedure of knot insertion Sederberg et al. have developed a local refinement algorithm which will be explained later on in more details and, secondly, a concept for removing superfluous control points which is called T-spline Simplification. By application of the removal algorithms it is possible to reduce the total number of control points which would be needed if the designed shape is defined via B-splines.

FIG. 5 illustrates the effect of transforming a NURBS model into T-splines. The total number of control points of the modeled head is reduced from 4712 to 1109 and from 10305 to 3955 for the woman respectively. As a consequence the designer obtains a more efficient control on the models and movements of the position of single control points have a close influences on the shape. Furthermore the concepts of T-splines are not only valid for surface modeling in two-dimensional but they can be easily extended to other dimensions and to T-NURCCs (Non-Uniform Rational Catmull-Clark Surfaces) which is the arbitrary-topology version of T-splines.

Mathematical Definition and Rules for T-splines

A T-spline can be deduced from the so-called point-based B-splines (PB-splines), which are introduced by Sederberg et al. in T. W. Sederberg, J. Zheng, A. Bakenov and A. Nasri, *T-splines and T-NURCCs, ACM Transactions on Graphics,* 22(3):477-484, July 2003, which is incorporated by reference herein in its entirety. PB-splines are defined by a set of control points and in two-dimensional a pair of knot vectors for each control point. To calculate the resulting surface points the following equation has to be solved:

$$P(s,t) = \frac{\sum_{i=1}^{n} P_i B_i(s,t)}{\sum_{i=1}^{n} w_i B_i(s,t)}$$

$B_i(s,t)$ are the blending functions which are defined by $$B_i(s,t) = N[s_{i0}, s_{i1}, s_{i2}, s_{i3}, s_{i4}](s) N[t_{i0}, t_{i1}, t_{i2}, t_{i3}, t_{i4}](t).$$

$N[s_{i0}, s_{i1}, s_{i2}, s_{i3}, s_{i4}](s)$ and $N[t_{i0}, t_{i1}, t_{i2}, t_{i3}, t_{i4}](t)$ respectively are the cubic B-spline basis functions which are given in general form by $$N_{i,0}(u) = \begin{cases} 1 & \text{if } u_i \leq u \leq u_{i+1} \\ 0 & \text{otherwise} \end{cases}$$

$$N_{i,p}(u) = \frac{u - u_i}{u_{i+p} - u_i} N_{i,p-1}(u) + \frac{u_{i+p+1} - u}{u_{i+p+1} - u_{i+1}} N_{i+1,p-1}(u).$$

The $u_i$ are the knots in the knot vector and p defines the degree of the spline. For a calculation of $B_i$ the basis function equations have to be evaluated using the short knot vectors $$s_i = [s_{i0}, s_{i1}, s_{i2}, s_{i3}, s_{i4}] \text{ and}$$

$$t_i = [t_{i0}, t_{i1}, t_{i2}, t_{i3}, t_{i4}]$$

respectively which are directly connected to the control point $P_i$. The weights $w_i$ can be chosen freely. If all $w_i$ are equal to 1.0 the PB-spline equation simplifies to $$P(s,t) = \frac{\sum_{i=1}^{n} P_i B_i(s,t)}{\sum_{i=1}^{n} B_i(s,t)}.$$

In contrast to a general defined PB-spline a T-spline is structured by a so-called T-mesh which defines some order to the positions of control points. An example of a T-mesh can be found in FIG. 6.

This mesh is important for the definition of the knot vectors which are closely connected to the control point $P_i$. Some requirements have been formalized which a T-mesh has to fulfill: (1) The sum of all knot intervals along one side of any face must equal the sum of the knot intervals on the opposing side. A knot interval equals the difference between two knots, so e.g. the $d_i$ and $e_i$ in FIG. 6, (2) two T-junctions have to be connected if and only if after connecting the new faces have equal sums of knot vectors on each opposing side. See T. W. Sederberg, D. L. Cardon, G. T. Finnigan, N. S. North, J. Zheng and T. Lyche, *T-spline Simplification and Local Refinement, ACM Transactions on Graphics,* 23(3):276-283, August 2004, which is incorporated by reference herein in its entirety.

The definition of the knot vectors $s_i$ and $t_i$ is based on knot intervals and quite different from the one which would be needed for calculating a B-spline surface. It is stated as Rule 1 in Sederbert, Cardon et al, cited above.

Consider a ray in parameter space $R(a)=(s_{i2}+a, t_2)$. Then $s_{i3}$ and $s_{i4}$ are the s coordinates of the first two s-edges intersected by the ray [. . . ]. An s-edge is a vertical line segment of constant s. The other knots in $s_i$ and $t_i$ are found in like manner. If all knot vectors are determined the T-spline can be calculated.

| s | N(s) | c | d |
|---|---|---|---|
| $[s_0, k, s_1, s_2, s_3, s_4]$ | $c_0 N[s_0, k, s_1, s_2, s_3](s) + d_0$ $N[k, s_1, s_2, s_3, s_4](s)$ | $c_0 = \frac{k - s_0}{s_3 - s_0}$ | 1 |
| $[s_0, s_1, k, s_2, s_3, s_4]$ | $c_1 N[s_0, s_1, k, s_2, s_3](s) + d_1$ $N[s_1, k, s_2, s_3, s_4](s)$ | $c_1 = \frac{k - s_0}{s_3 - s_0}$ | $d_1 = \frac{s_4 - k}{s_4 - s_1}$ |
| $[s_0, s_1, s_2, k, s_3, s_4]$ | $c_2 N[s_0, s_1, s_2, k, s_3](s) + d_2$ $N[s_1, s_2, k, s_3, s_4](s)$ | $c_2 = \frac{k - s_0}{s_3 - s_0}$ | $d_2 = \frac{s_4 - k}{s_4 - s_1}$ |

-continued

| s | N(s) | c | d |
|---|---|---|---|
| $[s_0, s_1, s_2, s_3, k, s_4]$ | $c_3\, N[s_0, s_1, s_2, s_3, k](s) + d_3\, N[s_1, s_2, s_3, k, s_4](s)$ | 1 | $d_3 = \dfrac{s_4 - k}{s_4 - s_1}$ |

Knot Insertion—Local Refinement Algorithm

One major advantage of T-splines is the possibility to insert new control points at arbitrary positions in the T-mesh without the requirement to add a whole new row or column of control points. Sederberg et al. have developed a procedure containing rules and algorithms for successful knot insertion. The insertion process is done in two phases which are called topology and geometry phase. In the topology phase the control points which have to be inserted additionally are identified and in the geometry phase the new coordinates and weights for the new T-mesh are calculated.

Sederberg et al. (cited above) states three possible violations which may occur during the insertion process and have to be corrected by inserting additional control points: Violation 1: a blending function is missing a knot dictated by Rule 1 for the current T-mesh. Violation 2: a blending function has a knot that is not dictated by Rule 1 for the current T-mesh. Violation 3: a control point has no blending function associated with it.

At first all control points are inserted at the position where more control is wanted. A grid check is done and additional points are inserted if a violation occurs. After solving all violations the new coordinates are calculated by linear transformation.

Adaptive Representation According to the Present Invention

The combination of the concept of T-splines and evolutionary optimization is a further aspect of the present invention.

T-Splines in Evolutionary Optimization

As already pointed out above an adaptive behavior of the representation is very important in terms of an optimization problem. One should try to keep the number of parameters as low as possible and to guarantee a wide variety of shape designs at the same time. T-splines offer a very good trade-off for this requirement in design optimization. Generally, the parameters are set to the control points of the T-mesh. So one can start with a quite low number of control points and in the course of the optimization control points can be added at any position to increase the resolution. So by application of this representation the high flexibility of T-splines can be used to position the control points directly where they are needed to achieve a maximum influence on the geometric shape while keeping the so-far best design. Because this will result in most cases to an addition of only a few control points the number of parameters is kept as low as possible. This affects the optimization in a very positive way.

Due to the fact that the parameter of the transformation determines the degree of freedom for the modification the parameter has to be set in a way, that the necessary changes can be performed by the selected parameter. In case of any kind of optimization the "necessary changes" are not known beforehand and can only be based on experience. To generally increase the degree of freedom one could simply increase the number of control points in case of the free-form deformation. This would make the influence of the control points more local and global changes to the design are much more difficult to realize because various control points have to be changed simultaneously. Furthermore there is a trade-off between freedom for the modification and the dimensionality of the optimization by changing the number of control points or the dimension of the matrix M in case of constrained deformations. This relation can also be observed representing curves or surfaces using splines.

The property of T-splines which is explained above is the reason for their development. By representing a surface by a e.g. a NURBS surface spline the addition of a single control point requires the addition of a full row and or column of additional control points only to satisfy the constrains given by the representation. The same holds true when applying free form deformation methods which define the transformation of a design into another modified design.

Existing methods of free form deformations require to define a mesh of control points which then define the transformation function between designs. An extension to this existing method of free form deformations is the automatic addition or removal of control points. This method allows to modify the modification of the transformation function during the optimization of a design. In case the given transformation functions does not provide a sufficiently high degree of freedom control points can be added to the existing set of control points. Due to this addition a higher degree of freedom exists in the transformation function and allows for more detailed deformations which can further improve the design concerning a given quality measure.

When introducing new control points in a spline (e.g. a surface spline) various methods exist to determine the optimal position of new control points in case of an approximation of a given surface. There, local and global approximation methods exist in order to find the optimal position for new control points. These methods however are only applicable in case of the existence of a local quality measure. When this local quality measure does not exist the methods cannot be applied. This is for example the case for quality measures which are based on aerodynamic properties of the represented body. For example in case of the optimization of turbine blades very often the pressure loss is used as a quality measure. This pressure loss depends on the whole body of the design and it cannot be determined beforehand where additional control points have to be introduced.

In this case the introduction of additional parameter of the transformation function can be realized by an additional mutation operator for the representation. Randomly control points are added in the spline which represents the transformation function. These modified representations then undergo the known process of evolution. Only in the case the additional control points are beneficial in the sense that they allow for positive variations of the transformation function they are selected during the process of evolution. Therefore the combination of the given method of free form deformation, methods for the introduction of control points and evolutionary computation provide an elegant way to adapt the transformation function used in free form deformations to the needs of the actual optimization.

Even if the described method of using spline functions as transformation functions which are modified by the explained method is an elegant way to increase the freedom of the optimization during the process to the special needs, the main drawback of the representation still exists. The introduction of a control point needs the introduction of several other control points only in order to fulfill the constraints of the representation. As already explained T-splines resolve this problem in case of the representation of surfaces. The use of T-splines instead of Nurbs splines allows for an introduction of single additional control points for that case.

In the same way than for surface modeling the use of T-spline can solve the problem during control point addition for free form deformations. In the same way than in the case of the extended free form deformation the introduction of new control points can be realized by an additional mutation operator. The additional mutation operator modifies the representation of the transformation instead of the parameter of the transformation in the same way. The mechanism which allows the selection of optimal positions for the introduction of additional control points is the same then already explained. The difference and the advantage is that the method allows the local extension of the transformation function.

Application of the Invention to Direct Manipulation of Free-Form Deformations

In the following, an application of the above-described framework to the direct manipulation of free-form deformations proposed by Hsu et. al. in W. M. Hsu, J. F. Hughes and H. Kaufman, *Direct Manipulation of Free-Form Deformations, Computer Graphics*, 26(2):177-184, July 1992, which is incorporated by reference herein in its entirety, is described.

Figure 7:
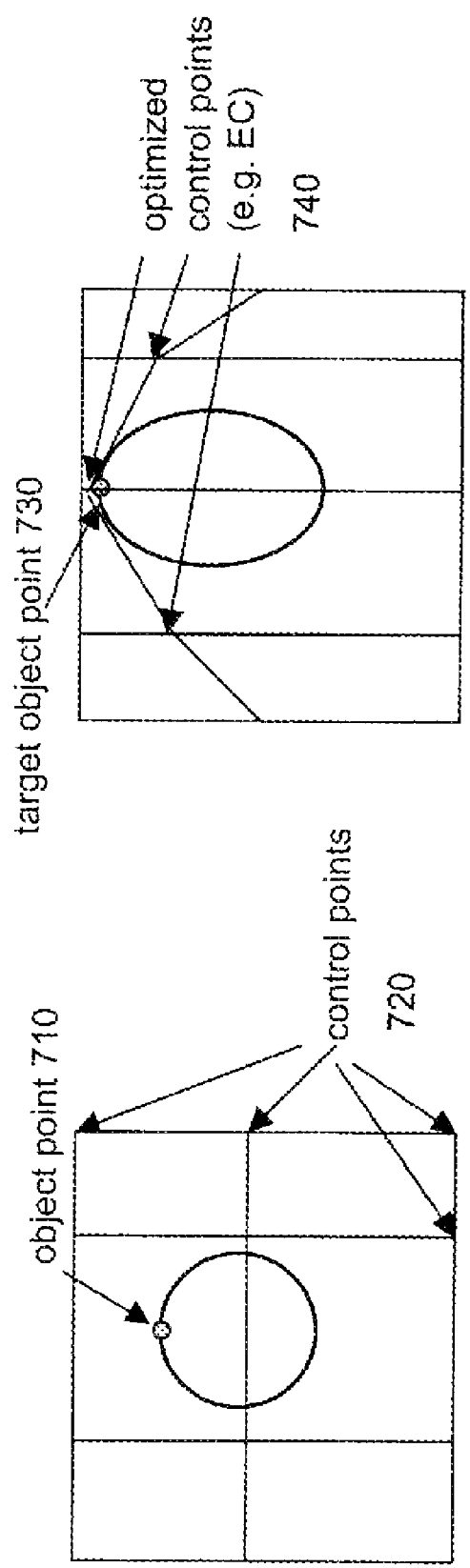
FIG. 7 shows (left) a simplified configuration of a design object and a grid comprising object and control points and (right) the same configuration with a chosen target point and derived control points in accordance with one embodiment of the present invention.

FIG. 7 shows on the left hand side a simplified configuration of a design object and a grid comprising an object point 710 and control points 720. On the right hand side of FIG. 7, the same configuration is shown with a chosen target point and derived control points.

A targeted movement of the object point, as indicated by target point 730, and a corresponding alteration of the object, is to be achieved by deriving control points 740 in the grid, which are considered "optimal", e.g. in the sense of a close overall approximation of a desired shape.

Figure 8:
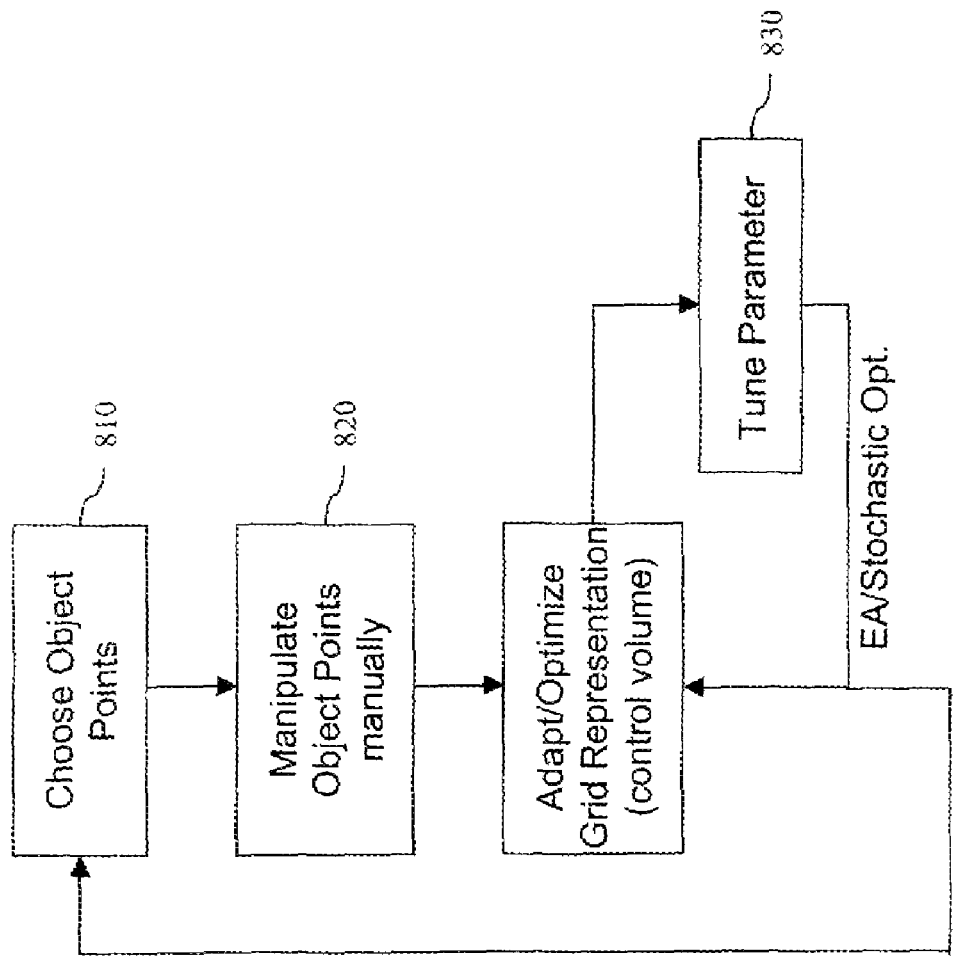
FIG. 8 shows a flowchart of a method for optimizing a design according to the invention in accordance with one embodiment of the present invention.

FIG. 8 shows a flowchart of a method for optimizing a design, wherein the object points are directly manipulated and the control points are chosen using an evolutionary algorithm.

In step 810, one or several object points are chosen. In step 820, the object points are manipulated directly, e.g. manually. The movement of the respective object point indicates a desired transformation of the design object. In step 830, the grid representation is adapted or optimized in order to find the optimal control structure to represent the desired transformation.

In one embodiment of the invention, this can be done by using evolutionary computation as described above. The control points may be encoded in a genome, inserting control points randomly, that is, at the same time adapting the chromosome and finally evaluating the new control structure or volume with respect to the targeted movement.

In another embodiment of the invention, stochastic optimization may be used instead of an evolutionary algorithm.

If several of these adapted control structures or volumes are evaluated in parallel, the "best" among them can be chosen according to some fitness function and then checked whether the targeted object point movement is achieved. If not, the adaptation repeats.

For defining the fitness function for choosing the "best" control structure, a decision is needed whether it is more important to achieve the targeted object point movements or whether the number and movements of control points have to be minimized.

In a further embodiment of the invention, the adaptation of the control structure or volume may by achieved by a "hybrid" approach, that is, it may be globally guided by an evolutionary algorithm which is locally supplemented by e.g. least squares optimization.

To summarize, the explained methods are based on the known representation of designs using a basic design which is then modified by a transformation function. In case of free form deformation techniques the transformation function is defined by a spline function which transforms the space in which the design is defined into a second space where the new modified design is defined. During the design process the parameter of the spline function determine the parameter of the transformation function. While using Evolution Strategies the parameter of the spline function determine at the same time the parameter the optimization algorithm works in. In order to adapt the transformation function optimally to the given problem and the necessary modification a mutation operator is proposed which allows to introduce and to delete control points. Instead of the standard mutation operator in evolution strategies this mutation operator works on the representation of the problem/design.

In some embodiments, the use of the underlying splines description introduces a single parameter that results in the introduction of many more points. However, a solution is described for the representation of spline surfaces and called T-Spline. In one embodiment a hyper dimensional extension of this special spline type is used as a transformation function. The parameter of this special transformation function can than be used within the framework of Evolutionary Computation and can be adapted to the special needs for the actual optimization by means of a new mutation operator working directly on the representation.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method implemented on a computer having a processor, for optimizing a design representing a physical object, comprising the steps:

representing the design of the physical object, using a model and a grid, wherein the model includes object points, the grid is a Free-Form Deformation (FFD) grid comprising control points, and wherein the representation of the Free-Form Deformation grid is variable and adaptive, and wherein the Free-Form Deformation grid is realized as a mesh of splines, and wherein the object points are user-selectable handles within the Free-Form Deformation grid;

applying an optimization algorithm on the design representation using the processor, comprising the step of modifying the design using direct manipulation of the object points; and adapting the grid by altering the position of the control points based on the manipulation of the object points to optimize the design, wherein during the optimization of the design representation the presentation of the grid is optimized by adding or removing single control points to increase or decrease the number of control points in the grid according to the optimization algorithm used in order to arrive at an optimal control point placement.

2. The method of claim 1, wherein the adaptation step uses an evolutionary algorithm.

3. The method of claim 2, wherein the adaptation step uses a local search method.

4. The method of claim 1, wherein the adaptation step uses a stochastic optimization algorithm.

5. The method of claim 4, wherein the adaptation step uses a local search method.

6. The method of claim 5, wherein the local search method is a least squares method.

7. A computer software program product embodied on a non-transitory computer readable medium for performing the method of claim 1 when run on a computing device.

8. A computer-based system for optimizing a design representing a physical object, comprising:

design representation means for representing the design, using a model and a grid, wherein the model includes object points, the grid is a Free-Form Deformation (FFD) grid comprising control points, and wherein the representation of the Free-Form Deformation grid is variable and adaptive, and wherein the Free-Form Deformation grid is realized as a mesh of splines; and wherein the object points are user selectable handles within the Free Form Deformation grid;

applying means for applying an optimization algorithm on the design representation, comprising the step of modifying the design using direct manipulation of the object points; and adaptation means for adapting the grid by altering the position of the control point based on the manipulation of the object points to optimize the design, wherein during the optimization of the design representation the representation of the grid is optimized by adding or removing single control points to increase or decrease the number of control points in the grid according to the optimization algorithm used in order to arrive at an optimal control point placement.

* * * * *